United States Patent
Mark et al.

(10) Patent No.: US 9,250,958 B2
(45) Date of Patent: Feb. 2, 2016

(54) SYSTEM, METHOD, AND APPARATUS FOR IMPROVING APPLICATION-LAUNCH LATENCIES

(71) Applicant: Qualcomm Innovation Center, Inc., San Diego, CA (US)

(72) Inventors: John L. Mark, San Diego, CA (US); Michael U. Schwartz, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 0 days.

(21) Appl. No.: 13/681,201

(22) Filed: Nov. 19, 2012

(65) Prior Publication Data
US 2014/0143791 A1  May 22, 2014

(51) Int. Cl.
*G06F 9/45* (2006.01)
*G06F 9/48* (2006.01)
*G06F 9/50* (2006.01)
*H04W 4/02* (2009.01)

(52) U.S. Cl.
CPC .............. *G06F 9/485* (2013.01); *G06F 9/5022* (2013.01); *H04W 4/027* (2013.01)

(58) Field of Classification Search
None
See application file for complete search history.

(56) References Cited

U.S. PATENT DOCUMENTS

| | | | | |
|---|---|---|---|---|
| 2002/0013829 A1* | 1/2002 | Kishimoto | ................... | 709/219 |
| 2009/0113444 A1* | 4/2009 | Hackborn et al. | ............ | 719/312 |
| 2009/0182945 A1* | 7/2009 | Aviles et al. | ................... | 711/122 |
| 2010/0273450 A1* | 10/2010 | Papineau | ................. | G06F 8/60 |
| | | | | 455/411 |
| 2012/0324481 A1* | 12/2012 | Xia et al. | ....................... | 719/320 |
| 2013/0024680 A1* | 1/2013 | Heidingsfeld et al. | ............ | 713/2 |
| 2013/0132854 A1* | 5/2013 | Raleigh | ................. | G06F 3/0482 |
| | | | | 715/738 |

* cited by examiner

*Primary Examiner* — Tuan Dao
(74) *Attorney, Agent, or Firm* — Neugeboren O'Dowd PC

(57) ABSTRACT

Methods and systems for launching applications on a computing device are disclosed. An exemplary method may include gathering data in connection with a launch of each of the applications that indicates one or more events occurring in connection with the launch of each application. When an indication of a particular event occurring is received, one or more out-of-memory values are modified based upon the data and the particular event. The out-of-memory values are indicative of a priority in which corresponding background applications are killed from running in the background of the computing device when memory runs low. When memory runs low on the computing device, one or more of the background applications are killed based upon the out-of-memory values to leave background applications running that a user is more likely to launch than the killed applications.

16 Claims, 8 Drawing Sheets

SYSTEM, METHOD, AND APPARATUS FOR IMPROVING APPLICATION-LAUNCH LATENCIES

FIELD OF THE INVENTION

The present invention relates to computing devices. In particular, but not by way of limitation, the present invention relates to application management on computing devices.

BACKGROUND OF THE INVENTION

Computing devices, such as smartphones, laptops, and tablet computers, are capable of running a variety of applications such as educational, gaming, financial, and utility applications. Increasingly, users are expecting more responsive launch of these applications when requested.

One technique for improving the responsiveness of a computing device to a user's request to launch an application is to place the application in the background of the user space when a user exits the application (instead of killing the application) so that the application may be launched more quickly when requested again by the user.

In many computing devices, however, when available memory becomes low, the device will kill lower priority background applications to free more memory. In an Android-based device, for example, the decision about which application in the background to kill is made by a low-memory killer component, which kills background applications based upon a value (referred to as an oom_adj value) that is assigned to each background application by the Android framework. These oom_adj values are typically between −17 to 15, and the higher the oom_adj value, the more likely that the background application will be selected to be killed by the low-memory killer if the device needs more memory.

In the context of an Android-based device, low oom_adj values (e.g., 0, 1, or 2) are assigned to applications that are visible or are being used by a visible application, but generally, when an application is exited it will be put in the background with an oom_adj value of 7, and as other applications are launched, this oom_adj value is incremented to higher and higher values. So, in practice, the least recently used background application is killed when the device needs memory. This least-recently-used algorithm for freeing up memory may work well in some instances, but in other instances it results in the killing of an application that the user was soon going to launch. As a consequence, the re-launching of the killed application from scratch (instead of from the background) results in a much longer launch latency, which may be an unpleasant experience for the user.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Aspects of the invention may be characterized as a method for reducing launch times of applications on a computing device. The method may include gathering data in connection with a launch of each of the applications that indicates one or more events occurring in connection with the launch of each application. When sufficient data is collected, the data is predictive of the application a user will launch after a particular event occurs. When an indication of the particular event does occur, one or more out-of-memory values are modified based upon the gathered data and the particular event. The out-of-memory values are indicative of a priority in which corresponding background applications are killed from running in the background of the computing device when memory runs low. When memory does run low on the computing device, one or more of the background applications are killed based upon the out-of-memory values to leave background applications running that a user is more likely to launch than the killed applications Aspects of the invention may also be characterized as a computing device that includes a memory to store a foreground application and a plurality of background applications. A low-memory-killer component kills one or more background applications when space in the memory becomes low and an activity manager component assigns an out-of-memory value to each of the background applications based upon when the background application was last in the foreground. A behavior prediction component gathers data about events that occur in connection with applications being launched, and modifies a particular out-of-memory value when an event occurs and the data indicates that when the event occurs that it is likely a user will launch a background application corresponding to the particular out-of-memory value that was modified.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. The word "exemplary" is used herein to mean "serving as an example, instance, or illustration." Any embodiment described herein as "exemplary" is not necessarily to be construed as preferred or advantageous over other embodiments.

Figure 1:
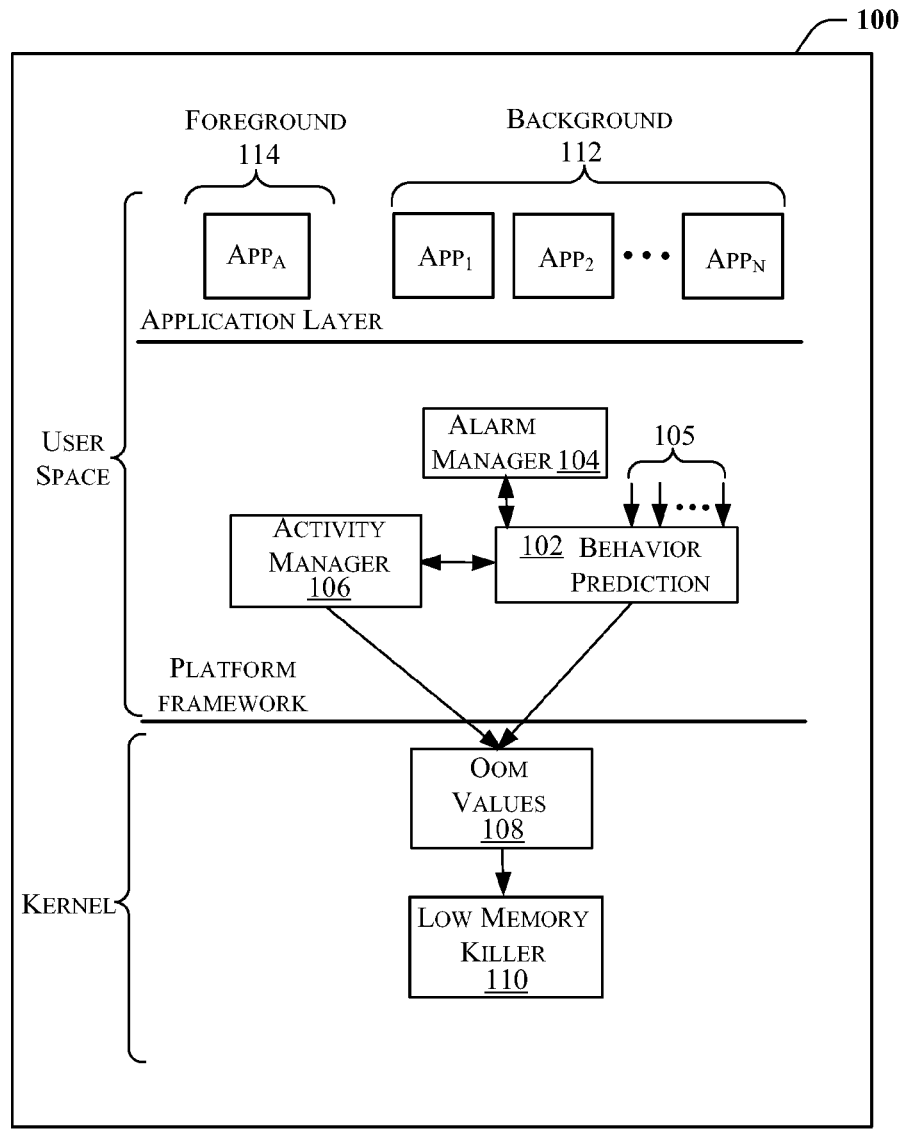
FIG. 1 illustrates a block diagram of a computing device according to several embodiments of the present invention.

Referring first to FIG. 1, it is a block diagram depicting exemplary components of a computing device 100. As shown, the exemplary computing device 100 includes a behavior prediction component 102 that is in communication with an alarm manager 104, and activity manager 106, and a collection of out-of-memory values 108, which are also accessible by a low memory killer component 110. Also depicted are a collection of N applications running in a background 112 of the computing device 100 and an application running in the foreground 114 of the computing device 100. The computing device 100 may be realized by any of a variety of devices such as a smartphone, PDA, netbook, tablet, laptop computer and other wireless devices.

The applications 102 may be any of a variety of applications that utilize memory in connection with performing their intended functions. For example, the applications may include gaming applications, utility applications, educational applications, and any other types of applications that utilize memory of the computing device 100. All of the depicted applications in the background 112 and foreground 114 are loaded in memory of the computing device 100, but the applications in the background 112 are removed from memory by the low memory killer 110 when available memory becomes low. As discussed further herein, the specific applications that are removed from the background are removed based upon out-of-memory values 108 that are assigned to each of the applications. Although the convention may certainly vary, as discussed above, in the context of the Android framework, out-of-memory values may vary from −17 to 15, and the higher the out-of-memory value, the more likely the background application will be removed from memory by the low memory killer 110.

As depicted in FIG. 1, the computing device 100 includes a platform that includes kernel level components and userspace components. For example, but not by way of limitation, the computing device may include one of an Android, Ubuntu, Windows, Brew MP, WebOS, or Meego platform, but for exemplary purposes only, the Android framework is often referred to herein.

In general, the behavior prediction component 102 operates in connection with the activity manager 106 and the alarm manager 104 to maintain applications running in the background 112 (e.g., applications residing in memory, but in a stopped state) that a user is more likely to launch again so those applications are available to be launched more quickly (e.g., to a running state). As one of ordinary skill in the art will appreciate, an application in the background 112 may be launched much more quickly than an application can be launched from scratch because all the objects for the background application are already loaded in memory and only need to be brought to the foreground 114. Although not required, the behavior prediction component 102 may be implemented as a background service (e.g., a daemon) that receives notifications from the activity manager 106 when applications are launched. And in addition, the behavior prediction component 102 may also receive notifications about time and day from the alarm manager 104 and other notifications 105 (e.g., location, acceleration changes, etc.) from other corresponding components (e.g., a GPS component, accelerometer component, accessory detection component, etc.), which are not depicted in FIG. 1 for clarity.

In general, the activity manager 106 functions, at the request of the user, to initiate the launching of applications in the foreground 114, and placing recently used applications in the background 112 when the applications are not currently in use. The activity manager 106 in this embodiment may also establish initial out-of-memory values (e.g., based simply upon the recency of when an application was last launched) that may be subsequently modified by the behavior prediction component 102. As depicted, the behavior prediction component 102 is in communication with the activity manager 106 so that the behavior prediction component 102 has an awareness of the applications being launched as they are launched.

As shown, the behavior prediction component 102 in this embodiment receives notifications of events from the alarm manager 104 and other notifications 105 of other events from other components. Some examples of these notifications may include: a notification that the computing device 100 is in a certain location; a notification that the computing device 100 has changed its acceleration (e.g., which may indicate the computing device 100 is in a car); a notification that the computing device 100 is coupled to an accessory (e.g., headphones); a notification from the alarm manager 104 of a particular day and/or time; and other notifications of events that may be predictive of the applications the user is prone to launch.

As discussed in more detail further herein, the behavior prediction component 102 utilizes existing data to predict the likelihood that each of a plurality of background applications will be launched—after one or more events—to increase the likelihood that the next application a user launches will be in the background 112. In many embodiments for example, the behavior prediction component 102 uses data that shows a predictive relationship between an event (e.g., one or more of an application launching, an email being received, a location change, a time of day, an acceleration of the computing device, etc.) and one or more other applications being launched, and this predictive relationship is used to determine which applications are retained in the background 112 instead of being killed.

This prediction-enabling data may be generated in advance (e.g., as default data) and/or it may be generated by the behavior prediction component 102 while the user is interacting with the computing device 100. Regardless of whether the data is generated in advance or whether it is dynamically generated, the data includes information that helps predict the next application that the user will launch.

Applicants have found that the applications a user tends to launch often follow certain patterns. For example, the launching of a search app (e.g., Google search) often precedes that launching of a browser app that a user launches to go to a webpage. And after receiving an e-mail notification, many users tend to launch an e-mail app (the e-mail notification service is different than the e-mail application). As another example, when a user launches a camera app to take a photo, a substantial likelihood exists that the user will launch a gallery app (e.g., to view the photo), and after the gallery app is launched, the user may launch a Facebook app to upload the photo. As yet another example, if the user likes to listen to music while they compose e-mail, then the e-mail app is often launched after the music app is launched.

Typical prior systems (e.g., the Android framework) do not make use of past user app launching patterns when updating the out-of-memory values (e.g., oom_adj values) for background applications, which means the prior art framework simply kills the least recently used application when memory gets low. In contrast, embodiments disclosed herein utilize data indicative of application launch patterns relative to other applications and/or events to update out-of-memory values so the background applications 112 are more likely to include an application the user will launch next. Again, the data may be generated in advance based upon generalized user patterns, and/or the data may be specifically generated based upon a specific user's application launch patterns.

In embodiments where a specific user's patterns are utilized to generate predictive data, the behavior prediction component 102 may record application launches to build up a record of which applications tend to be launched together. For example, if the data indicates that application A (e.g., a search app) is generally launched before application B (e.g., a browser app) then when application A starts to launch, the behavior prediction component 102 checks to see if application B is in the background 112, and if application B is in the background 112, the behavior prediction component 102 in connection with the activity manager 106 may modify (e.g., reduce) the out-of-memory value assigned to application B to help ensure it stays in the background 112.

By way of further example, suppose that when the user launches application A the user generally launches applications B and C afterwards. And further assume that at some point in the past the user has run applications B, C, D, E, F, and G and they are still in the background with the following out-of-memory values (e.g., Android oom_adj values): G (oom_adj=7); F (oom_adj=8); E (oom_adj=9); D (oom_adj=10); C (oom_adj=11); B (oom_adj=12). In this example, if the user launches application A, and the computing device 100 is low in memory, the low-memory-killer 110 might need to kill some applications in the background 112 in order to free up memory.

In the typical Android-based system, applications B and C would be killed because they have the largest oom_adj values. As a consequence, when the user launches applications B and C after application A, both applications B and C would take substantially longer to load because they would no longer reside in memory and would need to launch from scratch.

In contrast, the behavior prediction component 102, which takes past user behavior into account, would utilize data indicating applications B and C are often used after application A. So, when application A starts to launch, the behavior prediction component 102 in connection with the activity manager 106, would reduce the oom_adj values of applications B and C to make them less likely to be killed. For example, the oom_adj list may be modified to the following: G (oom_adj=7); C (oom_adj=7); F (oom_adj=8); B (oom_adj=8); E (oom_adj=9); and D (oom_adj=10). As a consequence, when application A launches, and the system needs more memory, the low memory killer 110 will kill applications D and E because they have the largest oom_adj values. As a consequence, when the user subsequently launches applications B and C, both applications B and C would launch quickly because they would launch from the background 112 instead of from scratch.

Although not required, the behavior prediction component 102 could be configured such that the amount an out-of-memory value of an application is modified is proportional to how frequently the launching of that application follows the launching of the currently running/launching application. For example if 25% of the time the user launches app B after launching of app A, the out-of-memory value of app B may be decreased by one when app A is launched. But if 90% of the time when the user launches app D and then launches app E, the out-of-memory value of app E could be decreased by four when app D is launched. Although the modification of out-of-memory values is described herein as a reduction to the out-of-memory value, it is certainly contemplated that other embodiments may be implemented in which applications with lower out-of-memory value are more likely to be killed, and in these embodiments, an out-of-memory value is increased when it is likely the corresponding app will be launched next.

In addition to modifying out-of-memory values, some embodiments of the behavior prediction component 102 preemptively prompt applications to start in the background 112 (e.g., in a lower priority thread) so that when the additional applications are launched, they are launched from the background 112 instead of from scratch. For example, if the launching of app B (e.g., an e-mail app) often follows the event A (e.g., receipt of an e-mail notification) then when event A happens, and app B is not in the background, then the behavior prediction component 102 may prompt the launching of app B in the background 112.

In addition to utilizing data that shows a predictive relationship between the launching of one application and other applications, correlations between specific applications launching and other events may be utilized. For example without limitation, events such as a change in location, time or day; an acceleration (or deceleration); and an accessory (e.g., head phones or mobile device dock) being coupled to the computing device 100 may be used to predict which application or applications the user is likely to launch in the near future.

Figure 2:
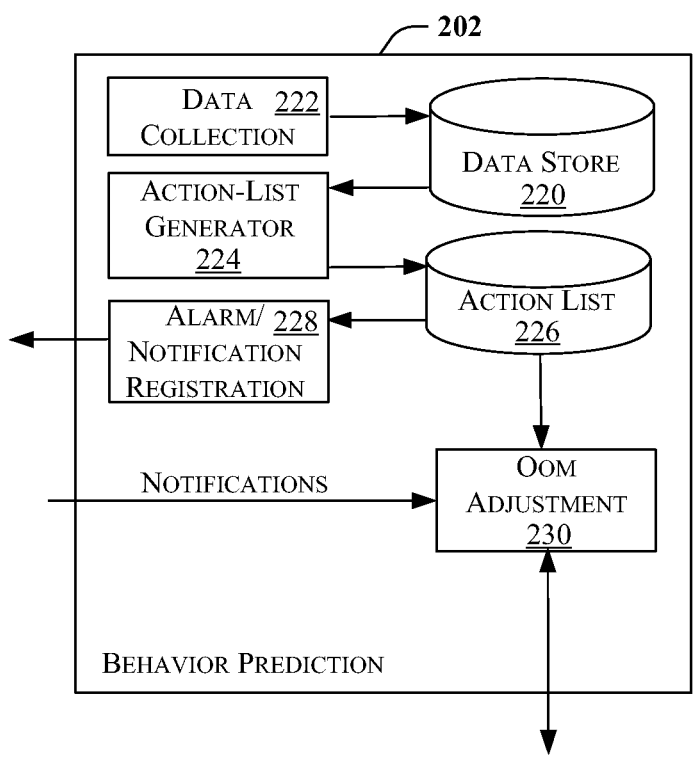
FIG. 2 is a block diagram depicting an exemplary embodiment of the behavior prediction component depicted in FIG. 1.

Referring next to FIG. 2, it is a block diagram depicting components of an exemplary behavior prediction component 202 that may be utilized to realize the prediction behavior component 102 described with reference to FIG. 1. As shown in this embodiment, the behavior prediction component 202 includes a data store 220 that is coupled to a data collection component 222 and an action-list generator 224, which is coupled to an action list 226. As depicted, the action list 226 is in communication with an alarm/notification registration component 228 and an out-of-memory (00M) adjustment component 203.

The illustrated arrangement of the components depicted in FIG. 2 is logical, the connections between the various components are exemplary only, and the depiction of this embodiment is not meant to be an actual hardware or software diagram; thus the components can be combined or further separated in an actual implementation, and the components can be connected in a variety of ways without changing the basic operation of the system.

Figure 3:
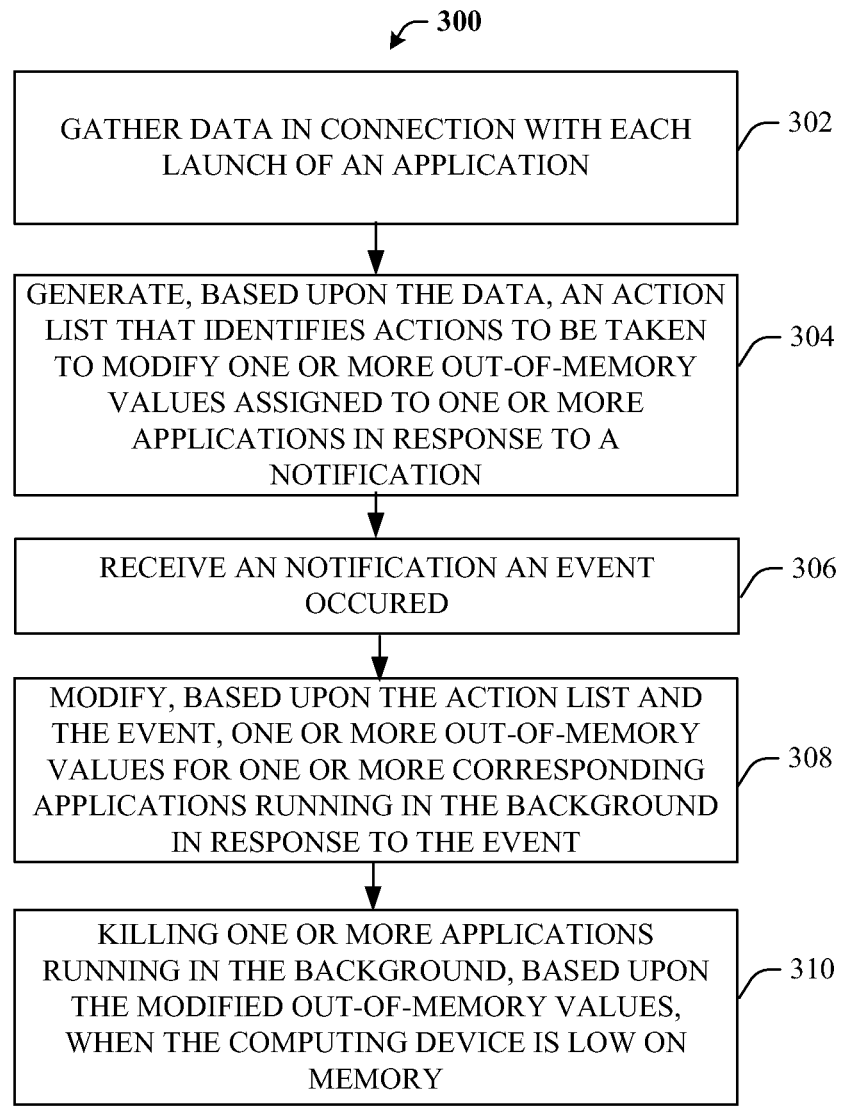
FIG. 3 is a flowchart depicting operations that may be carried out in connection with the embodiments described with reference to FIGS. 1 and 2.

While referring to FIG. 2, simultaneous reference is made to FIG. 3, which is a flowchart 300 depicting steps that may be traversed by the embodiments depicted in FIGS. 1 and 2. As shown in this embodiment, the data collection component 222 enables the behavior prediction component 202 to gather data in connection with each launch of an application to build a data store 220 (Block 302). Although one of ordinary skill in the art will appreciate, in view of this disclosure, that there are several ways that the data store 220 could be created, in general when an application is launched, data is collected about the status of one or more aspects of the computing device 100 when the application is launched.

Figure 4:
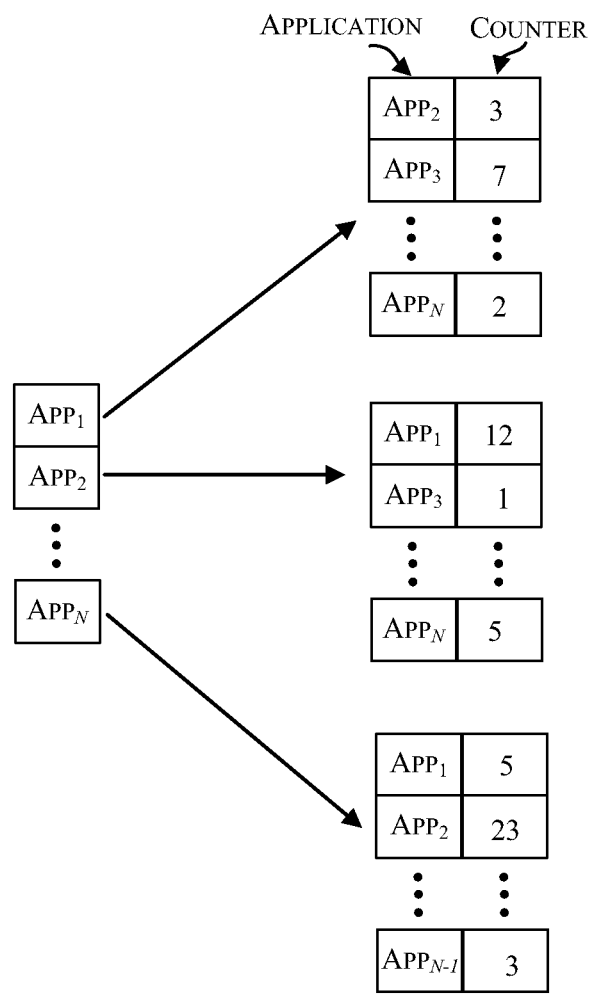
FIG. 4 depicts data that may be gathered by the behavior prediction component.

Referring to FIG. 4 for example, shown is an event table that depicts exemplary data collected about applications that have historically been launched after other applications. More specifically, for each of N applications, a count of a number of occurrences of each application being subsequently launched is maintained. During the data collection, when a current application is launched, a determination is made about which prior application was launched immediately before the current application, and then the prior application is referenced in the left column of the event table, and a counter is then incremented for the current application in the right column.

By way of example, if the current application that has just launched is App2 and the last application to be launched just prior to App2 is App1, then App1 is located in the left column and the counter for App2 (depicted as three) is incremented by one. In this way a count is kept for a number of times each application has been launched after each other application. In this exemplary set of data for instance, App3 launched one time after App2 during the data collection period, and App2 launched twenty-three times after the launch of AppN. Thus, there is a much stronger predictive correlation between App2 launching after AppN than App3 launching after App2.

Figure 5:
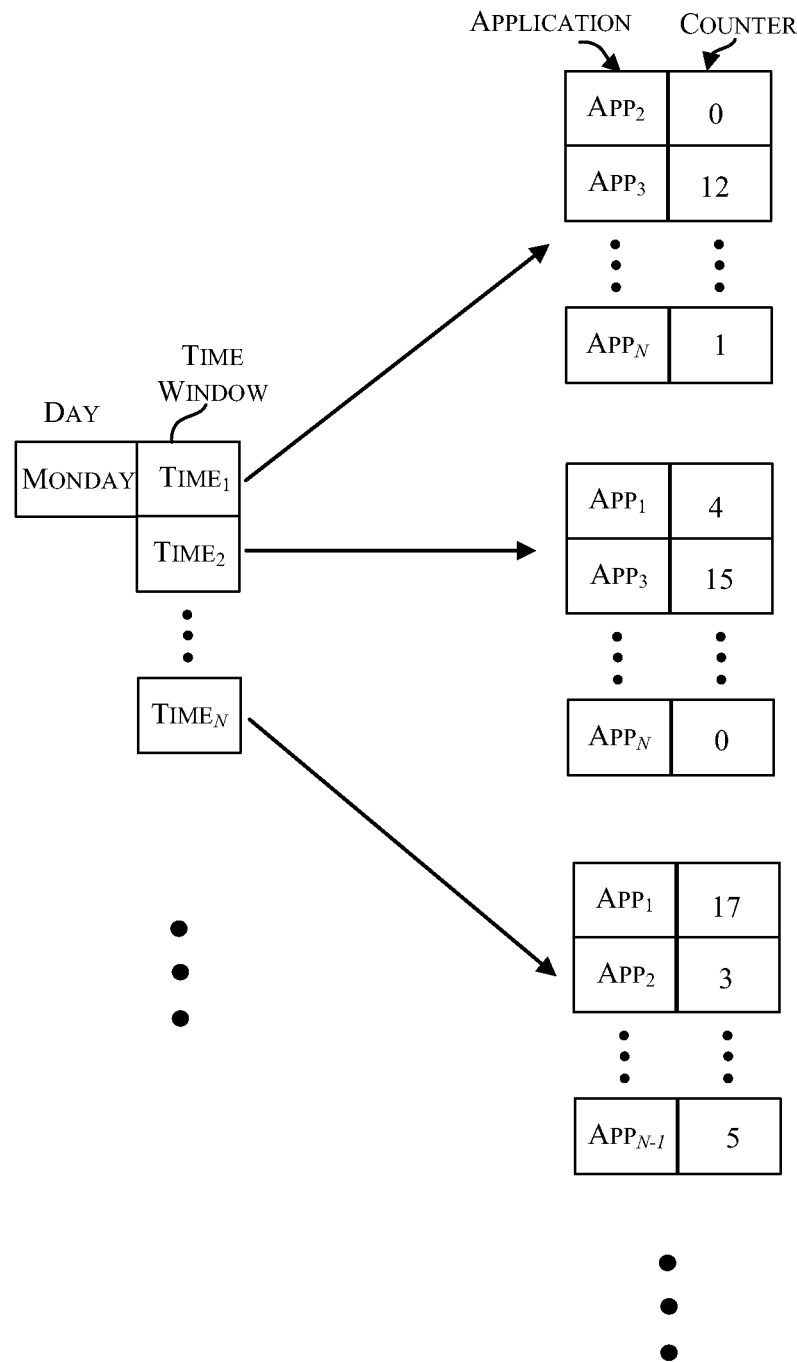
FIG. 5 depicts additional data that may be gathered by the behavior prediction component.

Referring to FIG. 5, it depicts an event table that includes exemplary data that relates each of a plurality of time windows of each day with a quantity each application has been launched. For example, App3 was launched on Monday, during the time period Time2, fifteen times while data was collected.

Figure 6:
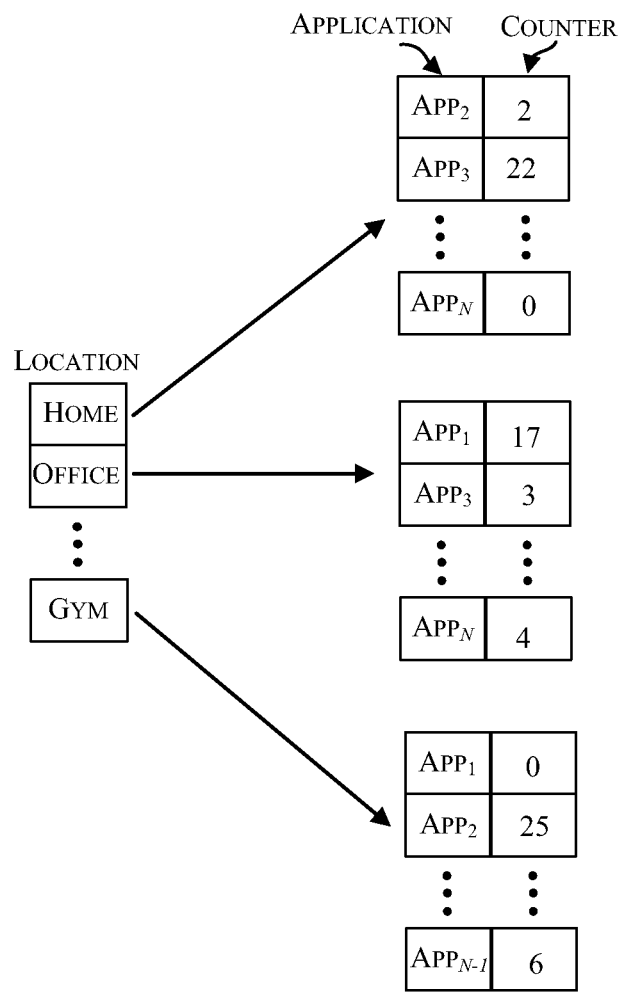
FIG. 6 depicts yet additional data that may be gathered by the behavior prediction component.

In FIG. 6, shown is an exemplary event table depicting hypothetical data that relates a location of the computing device 100 with a number of times each application was launched. As depicted, App2 (e.g., a music player) was launched twenty five times while the computing device 100 was at the user's gym, while App1 (e.g., a financial-news app) was not launched at all. Thus, it is more likely App2 will be launched when the user enters the gym than App1, and as a consequence, App2 may be given an out-of-memory value that makes it less likely than App1 to be killed when the user enters the gym. In some implementations, to prevent the aging of the collected data, the counter values discussed with reference to FIGS. 4-6 are reduced over time so that the counters reflect more current user patterns.

Referring again to FIGS. 2 and 3, the action list generator 224 generates, based upon the collected data, an action list that identifies actions to be taken to modify one or more of the out-of-memory values 108 in response to event notifications. In some implementations, the action-list generator 224 is designed to postpone its operation (e.g., the assessment of the collected data and generation of the action list) based upon the current load on system resources so the action-list generator 224 does not impede other operations taking place on the computing device 100. Although one of ordinary skill in the art will appreciate, in view of this disclosure, that a variety of statistical approaches may be applied to the gathered data to arrive at predictions about what application a user is likely to launch next, in one simple approach, once a counter (e.g., the counters depicted in FIGS. 4, 5 and 6) for an app exceeds a threshold, the action-list generator 224 may prompt an entry in the action list that indicates a specific modification to be made to an out-of-memory value; prompts an application to be launched to the background 112; and/or initiates yet another action.

Figure 7:
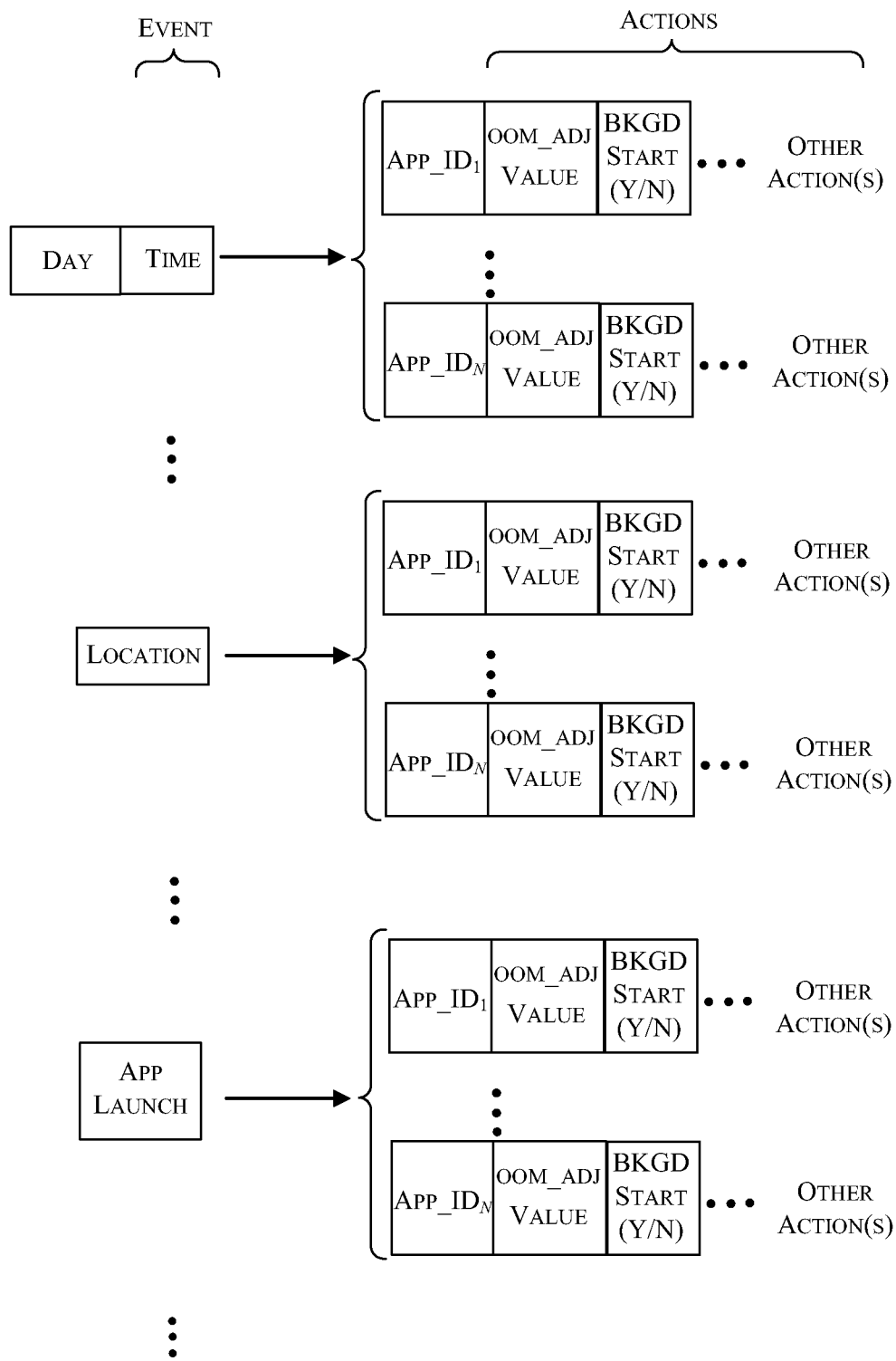
FIG. 7 depicts an exemplary action list that may be generated by the behavior prediction component.

Referring to FIG. 7, for example, shown is a representation of an exemplary action list. As shown, for each potential event (e.g., day/time change, location change, application launch, acceleration change, etc.) there are fields for potentially multiple actions that may be taken in connection with available applications to increase a likelihood that the next application launched by the user will reside in the background. For simplicity, only a single day/time combination, a single location, and a single application launch field are shown, but each of these single fields represents potentially multiple fields. For example, the left event column may identify multiple day/time combinations, multiple locations, and multiple applications, and each entry in the event column may be associated with several application-related sets of actions for each of N applications (depicted as separate rows within the actions columns in FIG. 7).

As shown, for each event the action list may include actions to be taken relative to potentially multiple applications. For example, a particular event may potentially prompt out-of-memory values to be adjusted for two applications and may also prompt a third application to be launched to the background. It should be recognized, however, that FIG. 7 is intended to be only an example of the type of data that may reside in an action list and that fewer (or more) event and action types may be implemented in an action list.

As depicted in FIG. 2, an alarm/notification registration component 228 is disposed to register for notifications of events to prompt the alarm manager 104 to provide notifications of changes in day and/or time; to prompt the activity manager 106 to provide notifications of particular applications being launched; and to prompt other components to provide other notifications 105 of events that may include a change in acceleration, change in location, an attachment/detachment of accessories, etc. In the context of an Android-based system, for example, a construct referred to as a SensorManager provides an API to receive indications of acceleration from an accelerometer of the computing device 100. In some variations, the particular notifications that are requested may vary depending upon the data that is collected. For example, if one or more apps is consistently launched when the computing device 100 is in a particular location, the alarm/notification registration component 228 may prompt the alarm manager 104 to send a notification when the computing device 100 is in that particular location.

As depicted, when the OOM value adjustment component 230 receives an indication that an event has occurred (Block 306), the OOM value adjustment component 230 may modify, based upon the action list and the event, one or more of the out-of-memory values 108 for one or more corresponding applications running in the background 112 to more closely align the out-of-memory values with the likelihood the user will launch particular applications in view of the event (Block 308). In addition, the OOM value adjustment component 230 may prompt a specific application to be launched to the background 112 if the collected data indicates there is a substantially strong correlation between the event and the user's inclination to launch the specific application.

As shown, when memory on the computing device is low, one or more of the applications running in the background 112 are killed based upon the modified out-of-memory values (Block 310), but the applications remaining in the background 112 include one or more applications that would have been killed if the out-of-memory values were not modified.

Figure 8:
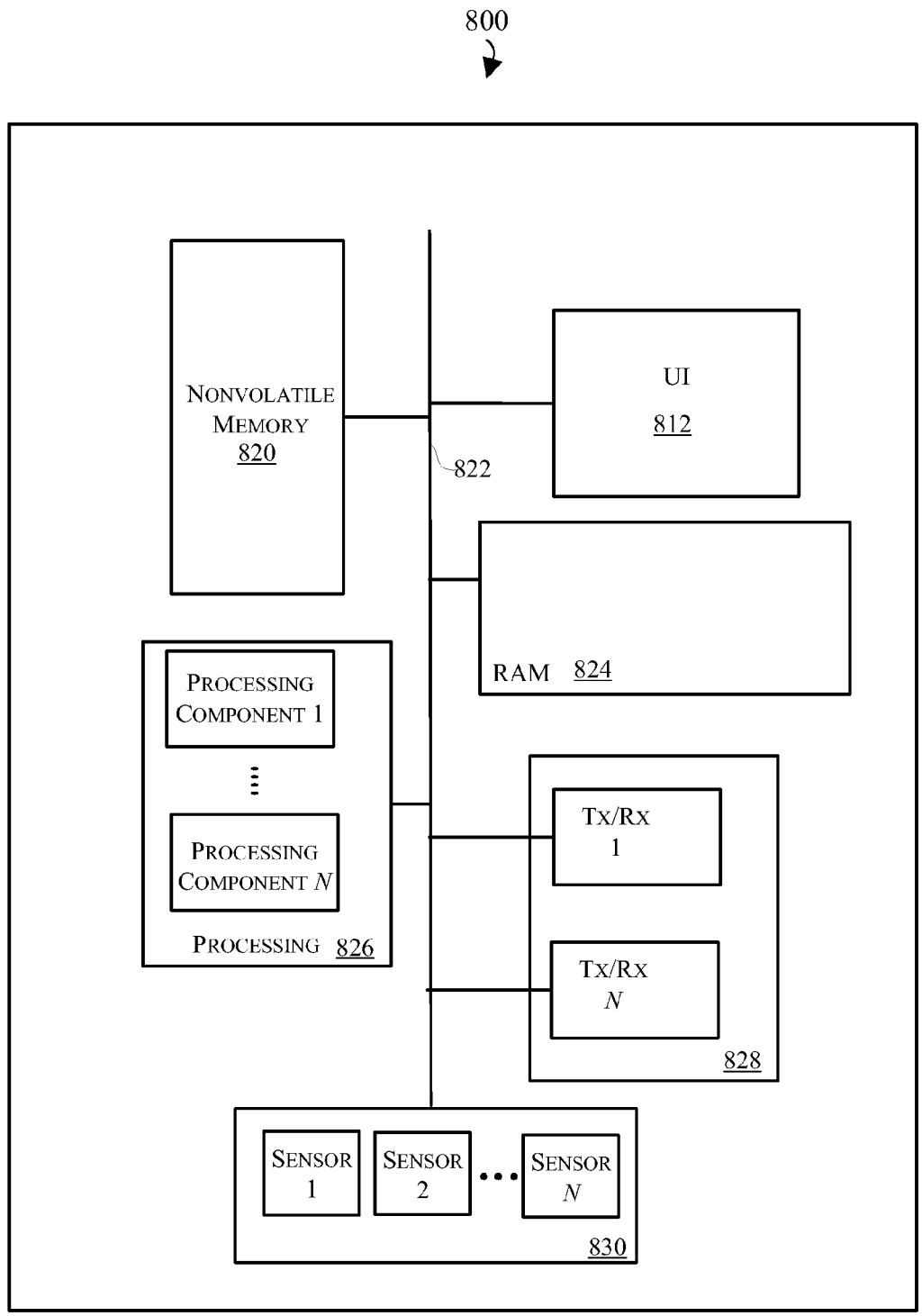
FIG. 8 depicts exemplary physical components that may be utilized to realize the embodiments described herein.

Referring next to FIG. 8, shown is a block diagram depicting physical components of an exemplary computing device 800 that may be utilized to realize the computing device 100 described with reference to FIG. 1. As shown, the computing device 800 in this embodiment includes a user interface 812, and nonvolatile memory 820 that are coupled to a bus 822 that is also coupled to random access memory ("RAM") 824, N processing components 826, a transceiver component 828 that includes N transceivers, and a sensor collection 830 that includes N sensors.

Although the components depicted in FIG. 8 represent physical components, FIG. 8 is not intended to be a hardware diagram; thus many of the components depicted in FIG. 8 may be realized by common constructs or distributed among additional physical components. Moreover, it is certainly contemplated that other existing and yet-to-be developed physical components and architectures may be utilized to implement the functional components described with reference to FIG. 8.

The user interface 812 generally represents one or more components that operate to enable a user to operate the computing device 800 and to receive information from the computing device 800. For example, the user interface 812 may include a display that provides a presentation of content to a user and may include a separate keypad that functions as an input device for the user. Alternatively, the user interface 812 may include a touchscreen that may be realized by any of a variety of touchscreen displays (e.g., LCD and OLED displays). One of ordinary skill in the art will appreciate that the user interface 812 may include other devices such as pointing devices (e.g., a mouse) that enable a user to interact with the computing device 800.

The nonvolatile memory 820 generally functions to store (e.g., persistently store) data and executable code including code that is associated with the functional components depicted in FIGS. 1 and 2. In some embodiments for example, the nonvolatile memory 820 includes bootloader code, modem software, operating system code, file system code, and code to facilitate the implementation of other components well known to those of ordinary skill in the art that are not depicted nor described in connection with FIGS. 1 and 2 for simplicity. In addition, in this embodiment the nonvolatile memory 820 includes data in the data store 220 and the action list 226.

In many implementations, the nonvolatile memory 820 is realized by flash memory (e.g., NAND or ONENAND memory), but it is certainly contemplated that other memory types may be utilized as well. Although it may be possible to execute the code from the nonvolatile memory 820, the executable code in the nonvolatile memory 820 is typically loaded into RAM 824 and executed by one or more of the N processing components 826.

The N processing components 826 in connection with RAM 824 generally operate to execute the instructions stored in nonvolatile memory 820 to effectuate many of the functional components of the computing device 800. As one of ordinarily skill in the art will appreciate, the N processing components 826 may include a video processor, modem processor, DSP, graphics processing unit (GPU), and other processing components.

The transceiver component 828 includes N transceiver chains, which may be used for communicating with one or more networks, and each of the N transceiver chains may represent a transceiver associated with a particular communication scheme. For example, each transceiver may correspond to protocols (both wire-based and wireless) that are specific to local area networks, cellular networks (e.g., a CDMA network, a GPRS network, a UMTS networks), and other types of communication networks 846.

The collection of N sensors may include a variety of sensors, such as an accelerometer, that provide information about events that may be utilized by the behavior prediction component 102 to alter which applications are maintained in RAM 824 within the background 112.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for launching applications on a computing device, the method comprising:
   gathering user behavior data in connection with a launch of each of the applications, the user behavior data indicating how often the launch of a first application corresponds to the launch of one or more second applications, wherein the gathering of user behavior data comprises;
   identifying a particular first application
   adding the particular first application to an application correlation table
   incrementing a counter in the application correlation table for one or more second applications to track a number of times that the one or more second applications were launched subsequently after the particular first application was launched, calculating, based on the number of times that the one or more second applications were launched after a particular first application, as stored in the application correlation table, a probability that each of the one or more second applications will be launched after the launch of the particular first application, modifying, in proportion to the probability, one or more out-of-memory values for the one or more second applications if the one or more second applications are running in the background of the computing device such that a most likely second application to be launched after the particular application receives a resulting out-of-memory value that makes the most likely second application a last of the background applications to be killed.

2. The method of claim 1, including:

launching, based upon the probability, the most likely second application into the background if the most likely second application is not already in the background, so the most likely second application launches more quickly.

3. The method of claim 1, wherein the modifying includes modifying a second out-of-memory value for a second-most-likely background application to be launched, such that the second-most-likely background application to be launched becomes the second-to-last background application to be killed.

4. The method of claim 1, wherein the application correlation table also tracks events that occur in conjunction with the launch of a particular first application, the events including an indication that the computing device is in a particular location, an indication of a particular time, an indication that the computing device has accelerated or decelerated, and an indication that a speaker or headset is coupled to the computing device.

5. A computing device comprising:

a memory to store a foreground application and a plurality of background applications;

a low-memory-killer component to kill one or more background applications when space in the memory becomes low;

an activity manager component that assigns an out-of-memory value to each of the background applications based upon when the background application was last in the foreground;

a behavior prediction component to gather user behavior data about how often the launch of the foreground application corresponds to the launch of one or more second applications, to calculate a probability that each of the one or more second applications would be launched subsequently after the launch of the foreground application, wherein the behavior prediction component is configured to:

identify the foreground application;

add the foreground application to an application correlation table;

increment a counter in the application correlation table for the one or more second applications to track a number of times that each of the one or more second applications is launched after the foreground application is launched or brought to the foreground; and proportionally modify one or more out-of-memory values of the background applications in response to the calculated probability, wherein the out-of-memory values for the background applications are modified such that a most likely second application to be launched or brought to the foreground after the launch of the foreground application makes the most likely second application the last of the background applications to be killed.

6. The computing device of claim 5, wherein the behavior prediction component prompts a most likely second application to launch in the background when the most likely second application is not running in the background.

7. The computing device of claim 5, wherein the behavior prediction component includes a list of events and an action-list generator that maintains a list of actions, based upon the gathered data about the events, to be effectuated in response to a variety of events occurring.

8. The computing device of claim 7, wherein the events include one or more of an indication that an application has launched, an indication that the computing device is in a particular location, an indication of a particular time, an indication that the computing device has accelerated or decelerated, and an indication that a speaker or headphones is coupled to the computing device.

9. A computing device comprising:

means for gathering user behavior data in connection with a launch of each of the applications, the user behavior data indicating how often the launch of a first application corresponds to the launch of one or more second applications, wherein the means for gathering of user behavior data comprises;

means for identifying a particular first application means for adding the particular first application to an application correlation table means for incrementing a counter in the application correlation table for one or more second applications to track a number of times that the one or more second applications were launched subsequently after the particular first application was launched, means for calculating, based on the number of times that the one or more second applications were launched after a particular first application, as stored in the application correlation table, a probability that each of the one or more second applications will be launched after the launch of the particular first application, means for modifying, in proportion to the probability, one or more out-of-memory values for the one or more second applications if the one or more second applications are running in the background of the computing device such that a most likely second application to be launched after the particular application receives a resulting out-of-memory value that makes the most likely second application a last of the background applications to be killed.

10. The computing device of claim 9, including:

means for launching, based upon the probability, the most likely second application into the background if the most likely second application is not already in the background, so the most likely second application launches more quickly.

11. The computing device of claim 9, wherein the means for modifying includes modifying a second out-of-memory value for a second-most-likely background application to be launched, such that the second-most-likely background application to be launched becomes the second-to-last background application to be killed.

12. The computing device of claim 9, wherein the application correlation table also tracks events that occur in conjunction with the launch of a particular first application, the events including an indication that the computing device is in a particular location, an indication of a particular time, an indication that the computing device has accelerated or decelerated, and an indication that a speaker or headset is coupled to the computing device.

13. A non-transitory, tangible computer readable storage medium, encoded with processor readable instructions to perform method for launching applications on a computing device, the method comprising:
   gathering past user behavior data in connection with a launch of each of the applications, the user behavior data indicating how often the launch of a first application corresponds to the launch of one or more second applications, wherein the gathering of user behavior data comprises;
   identifying a particular first application
   adding the particular first application to an application correlation table
   incrementing a counter in the application correlation table for one or more second applications to track a number of times that the one or more second applications were launched subsequently after the particular first application was launched,
   calculating, based on the number of times that the one or more second applications were launched after a particular first application, as stored in the application correlation table, a probability that each of the one or more second applications will be launched after the launch of the particular first application,
   modifying, in proportion to the probability, one or more out-of-memory values for the one or more second applications if the one or more second applications are running in the background of the computing device such that a most likely second application to be launched after the particular application receives a resulting out-of-memory value that makes the most likely second application a last of the background applications to be killed.

14. The non-transitory, tangible computer readable storage medium of claim 13, including:
   launching, based upon the probability, the most likely second application into the background if the most likely second application is not already in the background, so the most likely second application launches more quickly.

15. The non-transitory, tangible computer readable storage medium of claim 13, wherein the modifying includes modifying a second out-of-memory value for a second most likely background application to be launched, such that the second-most-likely background application to be launched becomes the second-to-last background application to be killed.

16. The non-transitory, tangible computer readable storage medium of claim 13, wherein the application correlation table also tracks events that occur in conjunction with the launch of a particular first application, the events including an indication that the computing device is in a particular location, an indication of a particular time, an indication that the computing device has accelerated or decelerated, and an indication that a speaker or headset is coupled to the computing device.

* * * * *